UNITED STATES PATENT OFFICE 2,647,141

PRODUCTION OF ISOPHTHALIC ACID

Robert Morris Cavanaugh, Carl Bruno Flack, and Robert Howard Weir, Woodbury, N. J., assignors to E. I. du Pont de Nemours & Company, Wilmington, Del., a corporation of Delaware No Drawing. Application December 29, 1949, Serial No. 135,844

7 Claims. (Cl. 260—524)

This invention relates to a process for the manufacture of isophthalic acid by the oxidation by means of nitric acid of a meta-dialkylbenzene, and more particularly to such a method in which high operating efficiency results.

It is known that oxidation products may be obtained by the reaction of meta-xylene and nitric acid. It is likewise known, however, that meta-xylene, in contrast to its ortho and para isomers, is oxidized with great difficulty by means of nitric acid. In fact, the action of dilute nitric acid has been used as a means for purifying meta-xylene from its isomers. Thus, when a mixture of xylenes has been treated with dilute nitric acid, the ortho- and para-xylenes have been oxidized by means of the nitric acid to the corresponding toluic acids, which could easily be removed, leaving the meta-xylene unchanged. When, by methods of the prior art, the meta-xylene purified in this manner has subsequently been treated with dilute nitric acid under more severe conditions, it has been found that the predominant oxidation product is meta-toluic acid. When isophthalic acid has been desired as the final product in substantial amounts, it has been necessary to oxidize the meta-toluic acid still further by other methods.

An object of the present invention is a one-step process for the production of isophthalic acid by the oxidative effect of nitric acid on a meta-dialkyl benzene. A further object is such a process in which high yields of isophthalic acid are obtained and the oxidized product consists mainly of this acid. A still further object is such a process for the oxidation of meta-dialkylbenzenes, characterized by greatly simplified procedure and increased efficiency. Additional objects will be disclosed as the invention is described more at length hereinafter.

We have found that the foregoing objects are accomplished when we cause dilute nitric acid and meta-xylene, meta-cymene, or like meta-dialkylbenzene, to react at elevated temperatures, for example between 180 and 280° C., and, after a sufficient time, separate the isophthalic acid from the residual acid solution.

The following examples will serve as specific embodiments of the process in accordance with the invention, but it will be understood that these are by way of illustration only and are not limiting in any way.

Example 1

Thirty pounds of 90% meta-xylene and 30 lb. of 30% nitric acid were introduced into a corrosion- and pressure-resistant reaction vessel provided with heating means at its lower portion and with agitating means. The mixture was heated to 157° C. and nitric acid of 30% concentration was introduced at the rate of 10 lb. per minute until the ratio by weight of total acid (as 100% $HNO_3$) to the meta-xylene reached 3:1 (a total of 300 lb. of 30% acid, including that originally introduced). The pressure was maintained at about 200 lb. per square inch and the temperature at about 188° C. until approximately ⅓ of the total acid had been added. During the addition of the remainder of the acid, the pressure was allowed to increase to 500 lb. per square inch and the temperature to 232–237° C. The reaction ceased approximately at the completion of the addition of the acid. The material was maintained at elevated temperature and pressure for an additional 10 minutes. The pressure was then released, and the charge was filtered, washed, and dried. This process was repeated with two further portions of the hydrocarbon, weighing 22 and 22.2 pounds, respectively, the initial acid in each case being the residual acid from the preceding run brought up to a concentration of 30% by the addition of fresh acid. The combined product from the three runs amounted to 80 pounds of isophthalic acid, i. e., a yield of 69%.

An oxidation similar to the one just described was carried out with a total of 86 pounds of 90% meta-xylene, three runs of 26, 30, and 30 pounds each being made. The maximum reaction temperature was 240° C. The total yield of isophthalic acid of purity greater than 93% was 86 pounds, or 65% of the theoretical. The yield based on the net meta-xylene content (90% of the hydrocarbon used) was, therefore, approximately 76% of the theoretical.

Example 2

Into a pressure-resistant reaction vessel having a capacity of 4 gallons was introduced 2.6 pounds meta-xylene, purified to a meta-xylene content of 98.6%, and 2 pounds of nitric acid of a concentration of 31.3%. To this mixture was fed 23 pounds of nitric acid of the same concentration (i. e., in an amount equal to a 3:1 net acid ratio) under pressure over a period of 15 minutes at a temperature of 155–180° C. The temperature was kept at 180° C. for 40 minutes. The pressure was then released and the charge was filtered, washed, and dried. The solid product consisted of 3.1 pounds of crude isophthalic acid, a yield of 76.3% of the theoretical.

Example 3

Into 20 g. 95% meta-xylene in a pressure-resistant vessel was fed 1200 g. 5% nitric acid (3:1 net acid ratio) over a period of 30 minutes at 230° C. under pressure. The filtered, washed, and dried product amounted to 16.8 g. crude isophthalic acid, a yield of 53.7% based on the 95% meta-xylene.

Example 4

The action of 30% nitric acid in a 6:1 net acid ratio on 8 g. meta-xylene at 180° C. and under pressure over a period of 30 minutes resulted in a 62.7% yield of crude isophthalic acid.

Example 5

A mixture of 175 g. meta-xylene and 175 g. 10% nitric acid was heated to 125° C. in a pressure-resistant vessel, and to this mixture was added under pressure 1110 g. 30% nitric acid over a 30-minute period. The net acid ratio was thus 2:1. The maximum temperature reached was 225° C. The mixture was cooled and pure oxygen was added until no further decrease in pressure as a result of reaction was observed. The temperature was again raised to 225° C., and allowed to cool to 90° C. The pressure was released and the charge was filtered, washed with hot water, and dried. The yield of crude isophthalic acid of a purity greater than 99% amounted to 192.5 g., or 70.2% of the theoretical.

A similar oxidation was carried out with 150 g. of meta-xylene, 30% nitric acid being added until the net acid ratio was 1.8:1 in this case. The yield of crude isophthalic acid was 171 g. or 72.7%.

Example 6

Mixed divinylbenzenes (5 g.) were oxidized by 100 g. 30% nitric acid (a 6:1 acid ratio) at 185° C. under pressure for 30 minutes. The solid product, consisting of a mixture of terephthalic and isophthalic acids (phthalic acid is soluble in the waste nitric acid) was esterified to yield separable mixed dimethyl esters, of which 1.5 g. was dimethyl isophthalate, representing a yield of 1.28 g. isophthalic acid.

Example 7

Mixed cymenes (30 g.) were oxidized under pressure by 30% nitric acid in a 6:1 net acid ratio at 180° C. for 30 minutes to give a total yield of 17.4 g. solid acids (a mixture of terephthalic and isophthalic acids, since phthalic acid is soluble in the waste nitric acid). Esterification of the solid acids and separation thereby demonstrated a para-isomer content of 26% in the original cymene mixture, and, by difference, assuming an 80% conversion (a representative value obtained in previous work with pure acids), a yield of 9.6 g. of isophthalic acid, or 32%, based on the original mixture of cymene isomers.

Example 8

Mixed diisopropylbenzenes (544 g.) were oxidized under pressure by 17.16 kg. 30% nitric acid (10:1 acid ratio) at 275° C. for a total of 44 minutes to give a yield of 437 g. solid acids (isophthalic and terephthalic acids). Esterification of the solid acids and separation thereby demonstrated a yield, assuming 80% conversion, of 87 g. isophthalic acid.

In carrying out the process, the strength of the nitric acid can be varied over a considerable range. In the examples, nitric acids of concentrations between 5% and 31.3% were added during the reaction and these concentrations are satisfactory. While the strength of the acid can be varied appreciably, we find it desirable to employ an initial concentration between 5% and 35% $HNO_3$. Our preferred nitric ratio is around 3 of 100% nitric acid to 1 of meta-dialkylbenzene when the latter is meta-xylene, but considerable variation of this ratio is possible between 1.8 and 10, without particular detriment to the yield.

As for operating conditions, a temperature between 180° C. and 280° C. will be maintained during the course of the reaction. When isophthalic acid of exceptionally high quality is desired, it is preferable to keep the temperature above 200° C. High pressure will be maintained in the autoclave also, as a result of the evolution of gaseous products and the high temperature prevailing. A pressure of 200–500 pounds per square inch was maintained in the examples, and pressures of this order of magnitude are satisfactory.

Several variations of the process illustrated in the examples may be followed. According to one of the methods shown, a small portion of the nitric is introduced into the meta-dialkylbenzene, the resulting mixture is heated, and the remaining nitric acid is introduced under pressure into the mixture. The initial portion of the nitric acid may comprse a heel of acid from previous runs butted to the desired nitric acid concentration or water alone may be used instead of an acid heel. Aaccording to another method described in the examples, the nitric acid is fed directly, under pressure, into the heated meta-dialkyl benzene. These are our preferred procedures. We may find it desirable, however, to feed both reactants simultaneously, in either a batch or a continuous operation. While the examples have illustrated batch procedure, this invention is excellently adapted to continuous operation, and this may be the most satisfactory procedure. We may at times find it desirable to introduce air or other oxygen-containing gas along with the nitric acid, as an aid to the oxidation.

A number of meta-dialkylbenzenes may be used in the process according to the invention. We prefer, however, to employ a meta-dialkylbenzene in which neither alkyl group contains more than three carbon atoms, such as meta-xylene, meta-cymene, meta-diisopropylbenzene, meta-divinylbenzene, metal-diethylbenzene, and the like. Of the meta-dialkylbenzenes of the structure described, meta-xylene is the preferred compound. When meta-xylene is used as the initial material, it will be of as high a state of purity as practicable, but it will almost invariably include some ortho- and para-isomers as impurities. The presence of these isomers in relatively small amounts presents no difficulties, however, as their oxidation products can readily be separated from the isophthalic acid.

The method disclosed is outstandingly an improvement over the procedures of the prior art. By the employement of the elevated temperature and pressure conditions described, a process has been developed which gives excellent conversions and yields. In fact, by this process, extraordinarily high conversion of the meta-dialkylbenzene to isophthalic acid has been obtained, any losses in yield being due to destruction of the meta-dialkylbenzene molecule and not to formation of intermediate products. Furthermore, whereas previous methods of oxidizing meta-dialkylbenzenes to benzenecarboxylic acids have required long periods of time, sometimes several days, the present process allows a single cycle to isophthalic acid to be completed in less than one hour, thereby greatly increasing plant capacity and decreasing operating difficulties. The use of dilute nitric acid in the process is of further economic advantage.

Isophthalic acid is a chemical compound of considerable importance as an intermediate in the preparation of other organic compounds and compositions, and an efficient method for its manufacture represents a desirable advance.

We have described our process at length in the foregoing, but it will be understood that many variations in details of conditions and procedure may be introduced without departure from the scope of the invention. While very favorable yields have been obtained without the use of catalysts, our process includes also catalytically promoted reactions, and a great number of different catalysts may be used.

We intend to be limited, therefore, only by the following claims.

We claim:
1. A process for the manufacture of isophthalic acid in a one-step process, which comprises reacting with dilute nitric acid at autogenous pressure at a temperature between 225° and 280° C. a meta-dialkylbenzene in which the number of carbon atoms in each of the alkyl groups is less than 4, said nitric acid having an initial strength between 5 and 35% and being present in a ratio by weight of between 2 and 10 parts 100% $HNO_3$ to 1 part meta-dialkyl benzene.

2. The process according to claim 1, wherein the meta-dialkylbenzene is meta-xylene.

3. The process according to claim 1, wherein the meta-dialkylbenzene is meta-cymene.

4. The process according to claim 1, wherein the meta-dialkylbenzene is meta-diisopropylbenzene.

5. The process according to claim 1, wherein the meta-dialkylbenzene is meta-diethylbenzene.

6. The process of claim 1, in which the reaction procedure comprises adding the nitric acid to the meta-dialkylbenzene.

7. A process for the manufacture of isophthalic acid in a one-step process, which comprises reacting with dilute nitric acid at autogenous pressure at a temperature between 200° and 280° C. a meta-dialkylbenzene in which the number of carbon atoms in each of the alkyl groups is less than 4, said nitric acid having an initial strength between 5 and 35% and being present in a ratio by weight of between 1.8 and 10 parts 100% $HNO_3$ to 1 part meta-dialkylbenzene, an oxygen-containing gas being introduced in addition to said nitric acid.

ROBERT MORRIS CAVANAUGH.
CARL BRUNO FLACK.
ROBERT HOWARD WEIR.

References Cited in the file of this patent

UNITED STATES PATENTS

| Number | Name | Date |
|---|---|---|
| 1,332,028 | Coblentz et al. | Feb. 24, 1920 |
| 1,488,730 | Beall et al. | Apr. 1, 1924 |
| 1,546,191 | Beall et al. | July 14, 1925 |

FOREIGN PATENTS

| Number | Country | Date |
|---|---|---|
| 216,091 | Germany | Nov. 22, 1909 |

OTHER REFERENCES

Fitting and others, Beilstein (Handbuch, 4th ed.), vol. 9, p. 832 (1932).